United States Patent
Mathey et al.

(10) Patent No.: US 7,486,342 B2
(45) Date of Patent: Feb. 3, 2009

(54) ELECTRICALLY CONTROLLABLE DEVICE HAVING VARIABLE OPTICAL QUALITIES OR SYSTEM WHICH IS HOLOGRAPHIC, THERMOTROPIC OR WHICH HAS SUSPENDED PARTICLES

(75) Inventors: Gregoire Mathey, Bourg la Reine (FR); Jean-Christophe Giron, Aachen (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/482,404

(22) PCT Filed: Jul. 10, 2002

(86) PCT No.: PCT/FR02/02413

§ 371 (c)(1), (2), (4) Date: Jan. 9, 2004

(87) PCT Pub. No.: WO03/007060

PCT Pub. Date: Jan. 23, 2003

(65) Prior Publication Data

US 2004/0169789 A1 Sep. 2, 2004

(30) Foreign Application Priority Data

Jul. 12, 2001 (FR) ..................... 01 09316

(51) Int. Cl.
*G02F 1/1335* (2006.01)
*G02F 1/1333* (2006.01)
*G03B 21/60* (2006.01)
*G03B 21/56* (2006.01)

(52) U.S. Cl. .................. 349/16; 349/86; 359/453; 359/460

(58) Field of Classification Search ............. 349/86, 349/16; 359/453, 460
See application file for complete search history.

(56) References Cited

U.S. PATENT DOCUMENTS 3,846,011 A * 11/1974 Stein .................. 359/460
5,891,556 A * 4/1999 Anderson et al. ........ 428/216
6,002,500 A   12/1999 Kim .................. 359/15
6,055,088 A * 4/2000 Fix et al. ............ 359/265

(Continued)

FOREIGN PATENT DOCUMENTS

EP  0 363 206  4/1990

(Continued)

OTHER PUBLICATIONS

U.S. Appl. No. 10/563,322, filed Apr. 4, 2006, Giron et al.

(Continued)

*Primary Examiner*—David Nelms
*Assistant Examiner*—W. Patty Chen
(74) *Attorney, Agent, or Firm*—Oblon, Spivak, McClelland, Maier & Neustadt, P.C.

(57) ABSTRACT

The subject of the invention is an element having variable optical properties, comprising:
(a) a system having electrically controlled variable light scattering, of the optical-valve or liquid-crystal system type, a suspended-particle system or a holographic or thermotropic system (a') which is associated with
(b) at least one absorbent element, absorbing at least in the visible range.

Figure 1:
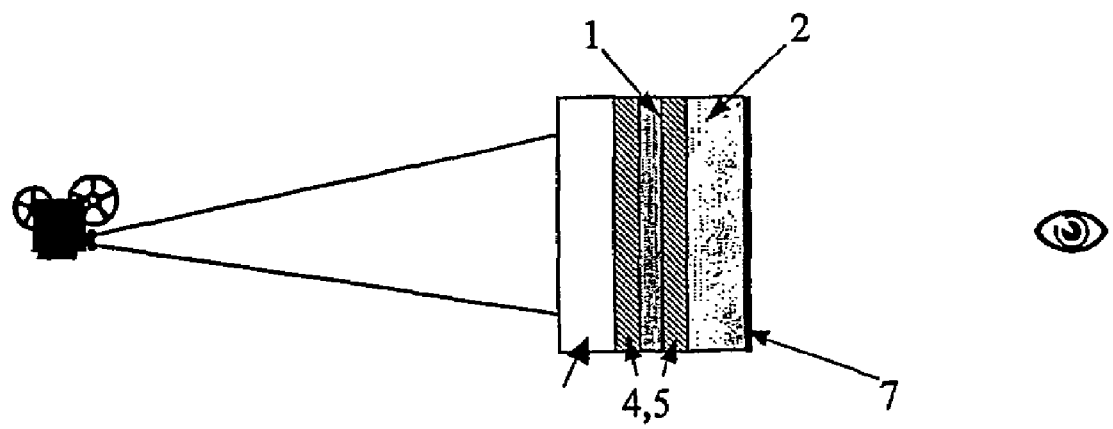

It applies especially to the manufacture of backprojection screens.

13 Claims, 1 Drawing Sheet

U.S. PATENT DOCUMENTS

| | | | |
|---|---|---|---|
| 6,160,655 A * | 12/2000 | Fix et al. .................... 359/265 |
| 6,710,797 B1 * | 3/2004 | McNelley et al. ........ 348/14.16 |
| 2003/0163367 A1 * | 8/2003 | Piepel et al. .................. 705/14 |
| 2004/0053125 A1 * | 3/2004 | Giron et al. ................. 429/152 |
| 2004/0169789 A1 | 9/2004 | Mathey et al. |

FOREIGN PATENT DOCUMENTS

| | | |
|---|---|---|
| EP | 0 643 318 | 3/1995 |
| EP | 0 814 365 | 12/1997 |
| EP | 0 964 288 | 12/1999 |
| FR | 2 751 097 | 1/1998 |
| JP | 6-308614 | 11/1994 |
| JP | 2000155308 A * | 6/2000 |

OTHER PUBLICATIONS

U.S. Appl. No. 10/564,501, filed Apr. 13, 2006, Giron et al.

* cited by examiner

ELECTRICALLY CONTROLLABLE DEVICE HAVING VARIABLE OPTICAL QUALITIES OR SYSTEM WHICH IS HOLOGRAPHIC, THERMOTROPIC OR WHICH HAS SUSPENDED PARTICLES

The present invention relates to electrically controllable systems having variable optical properties and more specifically to systems of the glazing type in which it is possible to modify the light scattering under the effect of a suitable power supply, such as liquid-crystal systems and optical valves.

Subsidiarily, the invention applies similarly to systems which exhibit significant light scattering, but only in a narrow range of viewing angles of incidence, such as holographic systems. It also applies to thermotropic systems and to suspended-particle systems or SPDs (suspended particle displays).

Liquid-crystal systems use a functional film based on a medium made of one or more polymers, in which droplets of liquid crystals, especially nematic liquid crystals exhibiting positive dielectric anisotropy, are dispersed. The liquid crystals, when a voltage is applied to the film, orient along a preferred axis, allowing vision. With no voltage applied, when the crystals are not aligned, the film becomes scattering and prevents vision. Examples are described in the patents EP-88 126, EP-268 877, EP-238 164, EP-357 234, EP-409 442 and EP-964 288. This type of film is generally placed between two substrates, for example between two sheets of polymer which are provided with electrodes, this structure then possibly being laminated between two glass plates to form glazing. This type of glazing is sold by Saint-Gobain Glass under the name PRIVA-LITE. In fact, it is possible to use any device using so-called NCAP (Nematic Curvilinearly Aligned Phase) or PDLC (Polymer Dispersed Liquid Crystal) crystals.

Systems based on optical valves generally use a functional film in the form of a matrix of a possibly crosslinked polymer, in which matrix are dispersed microdroplets containing particles capable of orienting in a preferred direction under the effect of an electric or magnetic field. Depending in particular on the potential applied and/or the nature and the concentration of orientable particles, the film may exhibit variable light transmission, generally associated with variable light scattering (when under voltage, the particles intercept very much less light than when there is no voltage). An example of this is described in the patent WO 93/09460, with a film comprising a matrix of crosslinkable polyorganosiloxane and absorbent particles of the polyiodide type.

Many applications have been envisioned for these types of system, for example for equipping internal partitions or constituting exterior glazing for buildings (especially in offices), or in means of locomotion on land (trains and cars), in the air (aircraft) or on the sea.

As mentioned in the patent EP-823 653, a novel application consists in using them as a backprojection screen operating in transmission, in which the projector lies on one side of the screen and the viewer on the other. The possible uses are numerous: for equipping shop windows, for advertising panels, for display panels in railway stations or airports, for example. The use of liquid-crystal systems makes projection possible without having to darken the room in which the projection takes place. However, with a standard system, the image contrast is not very good. This is the reason why the patent EP-823 653 proposes a solution for improving this contrast, which consists in juxtaposing, on the variable scattering system, a variable light transmission system of the electrochromic type. When the electrochromic system is under voltage, it darkens and gives the image projected onto the screen better contrast and, for the viewer, better visual comfort in a naturally or artificially lit environment; in particular, it makes it possible to absorb the stray light reflected in a diffuse manner off the screen coming from the illumination means placed on the side where the viewer is.

This solution is attractive, since the optical properties of the screen obtained can be varied extremely. However, it also has drawbacks: manufacture of the screen, requiring the juxtaposition of two functional systems, is not very simple, the resulting screen itself may have to have a significant thickness, and it is necessary to install two systems for connections and power supply.

The aim of the invention is therefore to improve the performance characteristics of a variable light scattering system like one of those described above, especially for the purpose of applying it as a projection screen, and to do so by means that are simple to manufacture, simple to implement and simple to maintain, and consequently less expensive.

The subject of the invention is firstly an element having variable optical properties, comprising:

(a) a system having electrically controlled variable light scattering, of the optical-valve or liquid-crystal system type, or a suspended-particle system or a system (a') which is not electrically controlled, such as a holographic or thermotropic system or one which is associated with (b) at least one absorbent element, absorbing at least in the visible range.

Within the context of the invention, the term "absorbent element (b)" is understood to mean an element which permanently has the desired optical property in the visible, without the need for electrical or other control.

It should be noted that it is also possible to include thermotropic systems among electrically controlled systems when they are associated with one or more heating elements (for example a conducting layer heating by the Joule effect), so as to make them switch at will, and not depending, in particular, on the environmental conditions to which they are exposed.

The invention has therefore chosen to add a functionality to a standard system (a) or (a'), namely light absorption that can be chosen by design to the desired Level, or to a higher level than it normally has, but without having recourse to a system requiring electrical control. In this way, manufacture of the assembly is simpler, by using absorbent elements that can be produced more quickly and more easily than electrochromic-type systems. Excellent results are obtained in terms of optical performance. Thus, for a given absorption A conferred by the absorbent element, in the case of an application of the device according to the invention to a backprojection screen operating in transmission, the reflection of the ambient light off the screen is reduced by a factor $A^2$. Since the light coming from the projection light source is also attenuated by a factor A, the increase in contrast of the screen is $A^2/A$, that is to say equal to A.

According to one embodiment of the invention, the system (a) is a liquid-crystal system as described above, comprising a film of liquid crystal droplets dispersed in a medium and contained by two protective sheets each provided with an electrode. These sheets may be chosen to be based on rigid, preferably essentially transparent substrates (glass or sufficiently thick polycarbonate (PC)) or semirigid or flexible substrates (thin polymer, such as thin PC). The two sheets may be of different types (a glass substrate and a polymer substrate for example).

In the preferred variant, the two protective sheets are based on a flexible polymer, especially transparent sheets of the PET (polyethylene terephthalate).

The absorbent elements (b) may be chosen to be of different types. It is possible to use one or more of them, whether of the same type or of different types. They will therefore "add" light absorption to the system (a) or (a'), over its entire area or most of its area.

The absorbent element may firstly consist of a rigid or semirigid substrate (glass or polymer) which is bulk-tinted by suitable dyes. It is preferred to chose glass substrates having a light transmission $T_L$ of 10 to 60% for a thickness of around 1 to 8 mm, especially 1.5 to 6 mm. Most particularly, it is possible to use the range of glasses sold under the name PARSOL or VENUS by Saint-Gobain Glass or to choose glass compositions like those described in the patents . . . Generally, it is preferred that the glass or the plastic substrate have a color in transmission that is as neutral as possible, especially in the grays. In an application as a backprojection screen, it is these tones which denature the original colors of the projected images the least.

The absorbent element may also consist of a bulk-tinted sheet of flexible polymer, especially a thermoplastic, that is to say the type of sheet used as insert sheet in laminated glazing. It may be made of polyvinylbutyral (PVB), polyurethane (PU) or ethylene-vinyl acetate (EVA). These tinted sheets have, for example, a light transmission $T_L$ of 25 to 60%, especially 30 to 45%, for a thickness generally between 0.2 and 0.8 mm (generally in the region of 0.38 mm). For the same reason as above, it will be preferred to choose a neutral color in transmission, for example in the grays. It is also possible to use a sheet based on a polymer having absorbent properties which will be calendered to a clear substrate, for example a clear glass.

The absorbent element may also be in the form of a thin absorbent layer placed on one side of a rigid (glass or polymer) substrate or semirigid or flexible (polymer) substrate forming part of the assembly of the element having variable optical properties. The term "thin layer" is understood to mean a layer of interferential thickness (of less than 1 μm, especially between 1 and 100 nm or 2 and 50 nm). It may also be a superposition of thin layers, at least one of which is absorbent in the visible. It may, for example, consist of layers based on nickel and/or iron and/or chromium oxide, that may be deposited by a thermal decomposition technique (pyrolysis in gas phase, in the form of powder or in liquid phase), by a vacuum technique (sputtering, especially sputtering enhanced by a magnetic field) or by sol-gel. When a sputtering process is used, the sputtering may be reactive in the presence of oxidizing elements of the $O_2$ type, using metal targets or substoichiometric oxide targets, or it may be nonreactive using oxide targets. The absorbent layer may also be essentially metallic, for example based on one of the following metals: nickel (Ni), chromium (Cr), Ni—Cr alloy, steel, Inconel alloy, Au or Au alloy, silver (Ag) or Ag alloy, or copper. It is therefore preferably deposited by nonreactive sputtering. It may also be based on one or more metal nitrides, of the TiN or ZrN type, which may be deposited by CVD or by reactive sputtering in the presence of nitriding elements using metal targets. The absorbent layer may also be based on an electrochromic material, such as optionally hydrated tungsten oxide, optionally hydrated nickel oxide and optionally hydrated iridium or tantalum oxide.

If the system (a) is a liquid-crystal system, another type of absorbent element (b) consists in using a dye within the functional film. Most particularly, this may be one of the dichroic dyes that are dissolved within the liquid-crystal droplets and/or in the medium in which they are dispersed.

These dichroic dyes are, for example, chosen from the family of diazoquinone derivatives or from that of anthraquinone derivatives. The percentage or weight of dye with respect to the liquid crystals, when this is dissolved therein, is preferably between 0.1 and 5%, especially between 0.5 and 2%. In the variant in which the dye is in the medium, its percentage by weight with respect to the medium may be between 20 and 30% for example.

If an electrically controllable system (a) is used, the absorbent element may be an electrically conducting absorbent layer forming part of one of the electrodes which supply the functional film with electricity. It may be a layer based on a conducting metal oxide (which can be deposited by pyrolysis or by sputtering, as in the case of the absorbent layer mentioned above). The oxide (or mixture of oxides) is preferably doped. The fact that it is absorbent comes, in a first variant, from the fact that it is in the reduced and/or oxygen-substoichiometric state (while still remaining an electrical conductor). For example, it may consist of indium oxide (doped with tin) and reduced, a tin oxide (for example doped with fluorine) and reduced, or a zinc oxide (for example doped with Al) and reduced. It may also consist of conducting oxides which are intrinsically absorbent, without being in the reduced state: this is the case with antimony-doped tin oxide which, at 30 nm, may have a light absorption A from 10 to about 62%, depending on the percentage of dopant (2.5 to 10% of dopant).

In a second variant, the fact that the conducting layer forming part of the electrode is absorbent stems from the combination of its chemical nature and the choice of its thickness. Thus, for a layer based on a doped metal oxide, the layer may become sufficiently absorbent for the invention if it is sufficiently thick. It is also possible to choose a layer based on a metal of the Ni, Cr or NiCr type, or on a metal nitride (TiN, ZrN, etc.), the thickness of which is suitably adjusted (for example, a TiN layer of about 25 nm which has a light absorption of about 50%).

The absorbent element may also be a film based on a plastic, which is absorbent and can be calendered, for example, to a clear substrate, especially a clear glass.

According to the invention, the element having optical properties, because of the presence of the one or more absorbent elements (b), sees its light absorption $A_L$ increase by at least 5% and/or sees its light reflection $R_L$ decrease by at least 5%, especially at least 8%.

The element having optical properties in its entirety has a light transmission $T_L$ of especially between 10 and 50%, preferably between 20 and 40%: this $T_L$ range is suitable for obtaining the desired absorption effect while maintaining a sufficient level of light transmission, the latter point being most particularly important when the electrically controllable variable scattering system is in the on state, that is to say in the energized and transparent state.

The preferred embodiment according to the invention consists of the element having variable optical properties which also includes:

(c) at least one element antireflecting in the visible (called antireflection coating in the rest of the text).

The antireflection element (c) may consist, according to a first variant, of an alternation of thin layers of interferential thickness having high and low refractive indices, in a (high-index layer/low-index Layer)$_n$ sequence, where $n \geq 1$. A high-index/low-index sequence, most particularly the first one starting from the substrate on which the antireflection coating lies, may be replaced with an intermediate-index layer of a material. Each "layer" may be a monolayer or a superposition of several layers having high or low indices respectively. The layers may be deposited by pyrolysis or by sputtering, like the absorbent layers mentioned previously.

The low-index layers may be made of $SiO_2$, $Al_2O_3$ or a mixture. The high-index layers may be made of $SnO_2$, $Si_3N_4$, $TiO_2$, $Nb_2O_5$, AlN, ZnO. The intermediate-layers may be a mixture of high-index and low-index oxides or SiON. Examples of suitable antireflection coatings are described in the patents EP-728 712, EP-911 302, WO 97/43224, WO 00/72053 and FR 99/14423. One example is that sold under the name VISION LITE by Saint-Gobain Glass. It may especially be a stack of the $Si_3N_4$ or $SnO_2/SiO_2/Si_3N_4$ or $Nb_2O_5/SiO_2$ type (it being possible for the $SiO_2$ to include a little metal of the aluminum type or a little boron, especially if it is obtained by sputtering). According to one advantageous embodiment, the antireflection coating may include an absorbent layer, for example one made of a nitride of the TiN or ZrN type: there are thus two functions at the same time, with a single multilayer stack in which the layers are deposited one after another by the same deposition method, namely the anti-reflection effect and absorption.

According to a second variant, the antireflection element is an antireflection film that can be applied by calendering it to the surface of a substrate of the glass or plastic type. For example, it may be a polyethylene terephthalate (PET) film provided with an antireflection coating or with a film of cellulose triacetate.

In the two variants, the antireflection coating is effective when it is deposited on the external face of at least one of the "external" substrates of the element having variable optical properties (the term "external substrate" is understood to mean that one which delimits the element, one face of which is accessible and turned toward the outside). The addition of at least one antireflection element is very advantageous within the context of application to a backprojection screen for transmission. This is because it will reduce the light reflection, preferably of that external face of the element in its entirety which is intended to be turned toward the viewer. It will therefore make it possible to reduce the light reflection coming from the unwanted illumination on the viewer's side. This effect is also beneficial, but much less pronounced, if it is placed on that external face which will be on the projector's side.

According to a third variant, the same type of antireflection effect is obtained by superficially modifying the external surface of at least one of these external substrates: this modification may consist of surface texturizing, or surface etching leaving calibrated excrescences, as described in patent FR 00/08842 filed on Jul. 6, 2000: at increasing depth, there is less and less material and more and more air, thereby creating, on the surface of the material (especially glass), an intermediate-index layer between the material in question and the air, hence an antireflection effect.

At first glance, it would seem to be surprising to combine, in one and the same element, an absorbent component absorbing in the visible (which will therefore help to lower the level of light transmission) and an antireflection component (which will on the contrary tend to increase the transmission in the visible to the detriment of reflection). In fact, the inventors have noticed that there is a synergy between these two components, which makes it possible to achieve excellent contrast levels when the overall element is used as a backprojection screen.

The configuration of the "overall" element of the invention may vary greatly: it is possible to use a glazing structure in the narrow sense of the term, that is to say using at least one glass substrate. In particular, it may have one, two or three glass substrates. It is also possible to replace all or some of these glass substrates with other rigid substrates of the polycarbonate type.

It is even possible to envision the case in which the element in its entirety does not contain any rigid substrates, and comprises for example only the functional film, of the liquid-crystal type, sandwiched between two sheets of flexible polymer which are provided with electrodes (of the doped $SnO_2$/PET or ITO/PET type), without including, of course, the connection elements and the possible peripheral seals.

A flexible screen is therefore obtained which can be wound up or tensioned by a frame or by other suitable tensioning means, as required, or it may be placed in the immediate vicinity of a conventional glazing assembly.

It is possible to have laminated glazing structures, especially of the type:

①—optional antireflection coating/glass 1/thermoplastic polymer sheet(s)/variable light scattering system/thermoplastic polymer sheet(s)/glass 2/optional antireflection coating, or else;

②—optional antireflection coating/glass 1/thermoplastic polymer sheet(s)/variable light scattering system/thermoplastic polymer sheet(s)/glass 2/thermoplastic polymer sheet(s)/glass 3/optional antireflection coating.

A single-glass configuration may be of the following type:

③—optional antireflection coating/glass 1/thermoplastic polymer sheet(s)/variable light scattering system/optional protective polymer sheet (s).

In these configurations, it is the glass 1 and/or glass 2 and/or glass 3 which may be bulk-tinted and/or provided with an absorbent layer, or one of the thermoplastic polymer sheets may be bulk-tinted.

As indicated above, a favorable configuration is one in which the glass closest to the viewer is this absorbent glass (absorbing by bulk coloration or by addition of a layer).

A preferred variant of this configuration is one in which this absorbent glass is provided with an antireflection coating.

The subject of the invention is the element in its entirety described above (which may include all the connections, power supplies, seals, peripheral frame which are known per se and suitable for this type of product), this element forming part of a backprojection screen operating in transmission.

Figure 2:
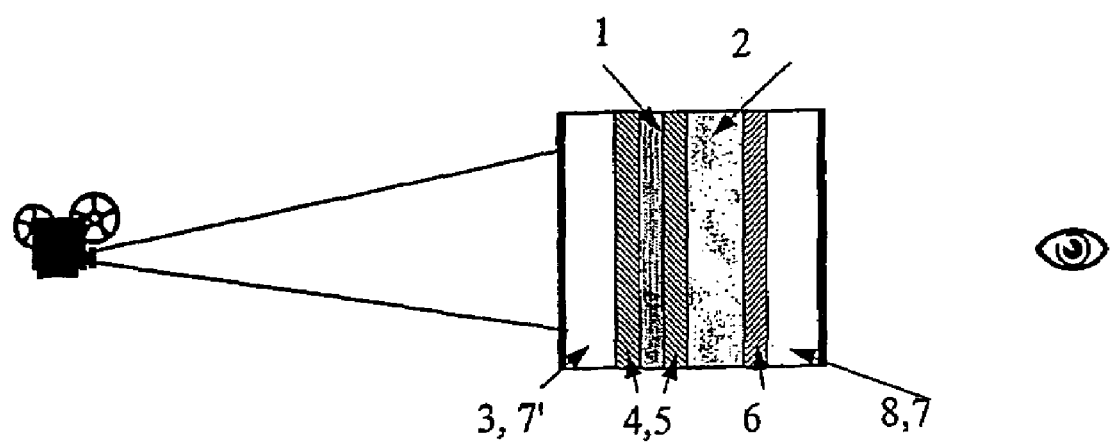

The invention will be described below in greater detail with the aid of the appended figures which show:

FIG. 1: a laminated glazing assembly according to the invention placed on two glass substrates, FIG. 2: a laminated glazing assembly according to the invention based on three glass substrates.

These figures are extremely diagrammatic and have not been drawn to scale in order to make them easier to examine.

In all the examples that follow, the liquid-crystal system 1 has the following configuration: PET sheet/electrode/functional film/electrode/PET sheet, the combination being actually used in PRIVA-LITE glazing assemblies Saint-Gobain Glass.

The functional film comprising the liquid emulsion based on nematic liquid crystals has a thickness of about 10 to 30 µm (preferably 20 to 25 micrometers). The PET sheets have a thickness of about 175 µm. The two electrodes consist of ITO (tin-doped indium oxide) having a resistivity of about 100 ohms per square.

Given below are a few details about the liquid crystals and their medium that can be used. With regard to the liquid crystals, these may be of the NCAP type, especially those used in PRIVA-LITE glazing assemblies, or of the PDLC type, which were mentioned above. As a general rule, their birefringence is between 0.1 and 0.2; it can vary, especially according to the medium used, around 0.1 if the polymer of the medium is of the polyurethane (PU) type, and around 0.2 if it is of the polyvinyl alcohol (PVA) type.

The medium is in fact preferably based on a polymer of the PU (latex) family and/or PVA family, the medium generally being prepared in aqueous phase with a polymer proportion of 15 to 50% by weight with respect to water.

The elements active as regards light scattering are advantageously in the form of droplets having a mean diameter of between 0.5 and 3 μm, especially between 1 and 2.5 μm, these being dispersed in the medium. The droplet size depends on a number of parameters, including especially the emulsifiability of the active elements in the medium in question. Preferably, these droplets represent between 120 and 220% by weight, especially between 150 and 200% by weight, of the medium, excluding the generally aqueous solvent for said medium.

It is particularly preferable to choose liquid crystals in the form of droplets having a diameter of about 2.5 μm when the medium is based on a polyurethane latex (birefringence of about 0.1) and with a diameter of about 1 μm when the medium is instead based on polyvinyl alcohol (birefringence of about 0.2).

The power uses voltages of between 0 and 110 V.

EXAMPLE 1

Comparative Example

This is a laminated glazing assembly based on two glass substrates according to FIG. 1, having the configuration:

Clear glass 3/EVA 4/predefined liquid-crystal system 1/EVA 5/clear glass 2, the clear glass substrates being made of standard silica-soda-lime glass sold by Saint-Gobain Glass under the name PLANILUX with a thickness of 2 mm. The EVA (ethylene-vinyl acetate) sheet has a thickness of 380 micrometers.

The liquid-crystal system is laminated in a known manner by applying pressure and/or heating to around 100° C.

EXAMPLE 2

This is a laminated glazing assembly of the same configuration as example 1, but the clear glass 2 has been replaced with a bulk-colored glass sold under the name VENUS VG10 by Saint-Gobain Glass with a thickness of 2.1 mm. This VENUS glass has the following characteristics: $T_L$ between 25 and 30%; in the case of the glass used here, the $T_L$ is 26.6% (under illuminant $D_{65}$) and it is gray in color.

This glazing is illustrated by FIG. 1, with the liquid-crystal system 1, the bulk-tinted glass 2, the clear glass 3 and the two EVA sheets 4, 5. Depicted schematically is also the projector for showing the most judicious way of placing the screen with respect to said projector (with the bulk-tinted glass on the opposite side to said projector).

EXAMPLE 3

Example 3 has a three-glass configuration according to FIG. 2: compared with the configuration of FIG. 1, a clear glass 8 with a thickness of 4 mm, laminated to the glass 2 and provided on the external face with an antireflection coating 7, is added. This antireflection coating is composed of the following multilayer stack:

$SnO_2/SiO_2/Nb_2O_5/Al:SiO_2$.

This coating is deposited in a known manner on the glass by magnetic-field-enhanced sputtering.

FIG. 2 thus illustrates another embodiment, in which the laminated glazing assembly has three glass substrates: added to the configuration according to FIG. 1, on the bulk-tinted glass 2 side, is a thermoplastic insert sheet 6 made of polyurethane with a thickness of 0.76 mm, making it possible to laminate the third glass 8, which is a clear glass identical to the clear glass 3. If an antireflection coating 7 is used, it is therefore on the external face of this third glass 8 that it is placed.

EXAMPLE 4

Example 4 repeats the configuration of example 3, and adds a second antireflection coating 7' (cf. FIG. 2) on the external face of the clear glass 3. The coating 7' is identical to the coating 7 of example 3. In this example, the glass substrates 3 and 8 have a thickness of 4 mm.

EXAMPLE 5

Example 5 repeats the configuration of the two-glass example 2 according to FIG. 2, but substitutes the bulk-colored VENUS glass 2 with another bulk-tinted glass 2 having a thickness of 5 mm and sold by Saint-Gobain Glass under the name PARSOL GRIS. Its characteristics are: $T_L$: 48.5%; color: gray.

EXAMPLE 6

Example 6 is a three-glass configuration according to FIG. 2, again using as glass 2 the tinted glass of example 5, and adding a 4 mm clear glass 8 provided with an antireflection coating 7, as in example 3.

EXAMPLE 7

Example 7 repeats the configuration of example 6, and adds an antireflection coating 7' (identical to that of example 4) to the external face of the clear glass 3. In this example, the clear glass substrates 3 and 8 each have a thickness of 4 mm.

EXAMPLE 8

This example is a laminated glazing assembly of the same configuration as in example 2, to which is added, by calendering to the external face of the tinted glass 2, an antireflection film 7 (plastic film) sold by Murei Danki under the reference "ReaLook 2201".

EXAMPLE 9

This example is a laminated glazing assembly of the same configuration as in example 5, to which is added, by calendering to the external face of the tinted glass 2, an antireflection film 7 identical to that used in example 8.

Table 1 below summarizes, for these nine examples:

the type of glass and/or the number of antireflection coatings used;

their light transmission measured under the $D_{65}$ illuminant in the off state, $T_{L,off}$, that is to say with no voltage, and in the on state, $T_{L,on}$, that is to say when a maximum voltage of 110 V is applied to the functional film;

their light reflection measured under the $D_{65}$ illuminant, on the tinted glass side (the viewer's side when referring to the figures), in the off state, $R_{L,off}$, and in the on state, $R_{L,on}$.

TABLE 1

|  | $T_{L,off}$ | $T_{L,on}$ | $R_{L,off}$ | $R_{L,on}$ |
|---|---|---|---|---|
| EX. 1: 2 clear glass substrates | 71.15 | 72.69 | 16.62 | 17.59 |
| EX. 2: 1 clear glass + 1 VENUS glass | 20.5 | 21.0 | 5.85 | 5.95 |
| EX. 3: 2 clear glass substrates + 1 VENUS glass and 1 antireflection coating | 21.20 | 21.55 | 1.36 | 1.53 |
| EX. 4: 2 clear glass substrates + 1 VENUS glass and 2 antireflection coatings | 22.25 | 22.72 | 1.32 | 1.41 |
| EX. 5: 1 clear glass + 1 PARSOL GRIS glass | 37.12 | 38 | 7.82 | 8.23 |
| EX. 6: 2 clear glass substrates + 1 PARSOL GRIS and 1 antireflection coating | 37.95 | 38.69 | 3.43 | 3.88 |
| EX. 7: 2 clear glass substrates + 1 PARSOL GRIS glass and 2 antireflection coatings | 39.95 | 41.09 | 3.16 | 3.48 |
| EX. 8: 1 clear glass + 1 VENUS glass and 1 antireflection coating on plastic | 21.15 | 21.51 | 2.42 | 2.48 |
| EX. 9: 1 clear glass + 1 PARSOL GRIS glass and 1 antireflection coating on plastic | 38.25 | 38.85 | 4.86 | 5.25 |

From these results, it may be seen that the use of a tinted glass instead of a clear glass makes it possible to lower the $T_L$ level both in the on state and in the off state very significantly (almost 50% in the case of the VENUS glass and more than 30% in the case of the PARSOL GRIS glass). At the same time, it allows the $R_L$ in the on state and in the off state to be substantially lowered (by about 8 to 10%, whether with the VENUS glass or with the PARSOL glass), which is spectacular. It is not obvious that the increase in light absorption provided by the bulk-tinted glass is accomplished both to the detriment of the light transmission and to the light reflection.

The combined use of a tinted glass and an antireflection coating, the antireflection coating preferably being on the tinted glass, allows the level of $R_L$ to be lowered even further, by about 4 to 6%, in order to reach truly very low values (of the order of 1 to 3%). Finally, the use of a second antireflection coating (on the clear glass) allows the level of $R_L$ of the glazing to be lowered even further.

It should be noted that in the three-glass configuration, the position of the glass substrates 2 and 8 may be reversed, that is to say the bulk-colored glass may be placed as the external glass, the intermediate glass being the clear glass. Of course, it is better to have two-glass structures rather than three-glass structures, especially in terms of weight, size and cost. However, it is more common to deposit stacks of thin antireflection layers on a clear glass than on an absorbent glass, and it may therefore be simpler from an industrial standpoint to adopt the three-glass configuration.

The invention claimed is:

1. A back projection screen including a layered optical element having variable optical properties, comprising:
   a first layer, said first layer being one of glass, a rigid substrate based on a polymer of polycarbonate, and a flexible polymer material;
   a first and a second thermoplastic polymer sheet layer, said first thermoplastic polymer sheet layer in contact with the first layer;
   (a) variable light scattering system, of optical-valve or liquid-crystal system type, a suspended-particle system or a holographic or thermotropic system, said variable light scattering system (a) sandwiched between the first and second thermoplastic polymer sheet layers;
   a second layer, said second layer being one of glass, a rigid substrate based on a polymer of polycarbonate, and a flexible polymer material, said second layer in direct or indirect contact with the variable light scattering system; and
   at least one element antireflecting in the visible range,
   wherein at least one of said first and second layers comprise
      (b) an absorbent element, absorbing light at least in the visible range and chosen from at least one of the following elements: a plastic rigid substrate, a bulk-tinted glass, a bulk-tinted sheet of flexible polymer of thermoplastic type, a plastic film configured to be calendered to a rigid substrate, or a thin absorbent layer placed on one of a face of a glass or plastic rigid substrate or of a sheet of flexible polymer, and
   the back projection screen does not include a power source for the absorbent element, and the back projection screen does not include an electrochromic material.

2. The back projection screen as claimed in claim 1, wherein the bulk-tinted glass or the bulk-tinted sheet is a gray color.

3. The back projection screen as claimed in claim 1, wherein the absorbent element (b) is configured to increase light absorption of the layered optical element by at least 5%, and/or lowers light reflection of the layered optical element by at least 5%.

4. The back projection screen as claimed in claim 1, wherein the at least one antireflecting element is one of
   an alternation of thin layers of interferential thickness having high and low refractive indices (high-index layer/low-index layer)$_n$, where n>1, and
   a single layer having an intermediate refractive index.

5. The back projection screen as claimed in claim 1, wherein the at least one antireflecting element is an alternation of thin layers including an absorbent layer,
   said absorbent layer including metal nitride or another absorbent material.

6. The back projection screen as claimed in claim 1, wherein the at least one antireflecting element comprises the following multilayer stack:
   $Si_3N_4$ or $SnO_2/SiO_2/Si_3N_4$ or $Nb_2O_5/SiO_2$.

7. The back projection screen as claimed in claim 1, wherein the at least one antireflecting element comprises one of
   an antireflection film using a plastic film of antireflection-treated polyethylene terephthalate or cellulose triacetate, and
   a surface texturing of an external substrate of said layered optical element.

8. The back projection screen as claimed in claim 1, wherein the layered optical element is a laminated glazing assembly having the following layers sequentially in contact:

optional antireflection coating/the first layer made of glass/ thermoplastic polymer sheet(s)/variable light scattering system/thermoplastic polymer sheet(s)/the second layer made of glass/optional antireflection coating.

9. The back projection screen as claimed in claim 1, wherein at least one antireflecting element comprises:

at least one coating antireflecting in the visible range, deposited on an external face of said absorbent element.

10. A back projection screen including a layered optical element having variable optical properties, comprising:

a first layer, said first layer being one of glass, a rigid substrate based on a polymer of polycarbonate, and a flexible polymer material;

a first and a second thermoplastic polymer sheet layer, said first thermoplastic polymer sheet layer in contact with the first layer;

(a) variable light scattering system, of optical-valve or liquid-crystal system type, a suspended-particle system or a holographic or thermotropic system, said variable light scattering system (a) sandwiched between the first and second thermoplastic polymer sheet layers;

a second layer, said second layer being one of glass, a rigid substrate based on a polymer of polycarbonate, and a flexible polymer material, said second layer in direct or indirect contact with the variable light scattering system, wherein at least one of said first and second layers comprise (b) an absorbent element, absorbing light at least in the visible range and chosen from at least one of the following elements: a bulk-tinted sheet of flexible polymer of thermoplastic type, a plastic film configured to be calendered to a rigid substrate, or a thin absorbent layer placed on one of a face of a glass or plastic rigid substrate or of a sheet of flexible polymer, and the back projection screen does not include a power source for the absorbent element, and the back projection screen does not include an electrochromic material.

11. The back projection screen as claimed in claim 10, wherein the bulk-tinted sheet is a gray color.

12. The back projection screen as claimed in claim 10, wherein the absorbent element (b) is configured to increase light absorption of the layered optical element by at least 5%, and/or lowers light reflection of the layered optical element by at least 5%.

13. The back projection screen as claimed in claim 10, wherein the layered optical element is a laminated glazing assembly having the following layers sequentially in contact:

optional antireflection coating/the first layer made of glass/ thermoplastic polymer sheet(s)/variable light scattering system/thermoplastic polymer sheet(s)/the second layer made of glass/optional antireflection coating.

* * * * *